US009449570B2

(12) United States Patent
Huang et al.

(10) Patent No.: US 9,449,570 B2
(45) Date of Patent: Sep. 20, 2016

(54) DRIVING CIRCUIT

(71) Applicant: Raydium Semiconductor Corporation, Hsinchu (TW)

(72) Inventors: Chih-Chuan Huang, Kaohsiung (TW); Chien-Ming Chen, Tainan (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 356 days.

(21) Appl. No.: 14/052,372

(22) Filed: Oct. 11, 2013

(65) Prior Publication Data

US 2014/0104257 A1 Apr. 17, 2014

(30) Foreign Application Priority Data

Oct. 12, 2012 (TW) ............................. 101137742 A

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.

CPC ........ *G09G 3/3614* (2013.01); *G09G 2330/06* (2013.01)

(58) Field of Classification Search

CPC ........................ G09G 2330/06; G09G 3/3614

See application file for complete search history.

(56) References Cited

U.S. PATENT DOCUMENTS

| | | | | |
|---|---|---|---|---|
| 2003/0112386 A1* | 6/2003 | Bu | G09G 3/3611 | 349/96 |
| 2003/0174109 A1* | 9/2003 | Tateuchi | G09G 3/3614 | 345/88 |
| 2009/0102828 A1* | 4/2009 | Arai | G02B 26/0841 | 345/213 |

* cited by examiner

*Primary Examiner* — Kumar Patel
*Assistant Examiner* — Insa Sadio

(57) ABSTRACT

A driving circuit for connecting a display module is provided. The driving circuit includes a polarity control module, an output control module, and a detecting module. The polarity control module provides a polarity control signal. The output control module is connected with the polarity control module and provides a plurality of output control signals. The detecting module is coupled with the polarity control module and the output control module, wherein the detecting module detects the polarity control signal and selectively controls the output control module to operate in at least one of a first control mode and a second control mode to control the output control signals.

20 Claims, 4 Drawing Sheets

DRIVING CIRCUIT

CROSS-REFERENCE TO RELATED APPLICATIONS

This non-provisional application claims priority under 35 U.S.C. §119(a) on Patent Application No(s). 101137742 filed in Taiwan, R.O.C. on Oct. 12, 2012, the entire contents of which are hereby incorporated by reference.

BACKGROUND OF THE INVENTION

1. Field of the Invention

The present invention generally relates to a driving circuit; particularly, the present invention relates to a source driving circuit having a judgment mechanism and capable of decreasing the noise.

2. Description of the Prior Art

In general, displays are widely used in computers, ATMs, TVs, electrical billboards, cellphones, etc. For instance, the types of displays include cold-cathode fluorescent lamps (CCFLs), plasma displays, LCDs, LED displays, or other displays. In practical applications, the LCD has advantages such as light weight, thin dimension, highly energy saving, low price, etc., and further becomes the most popular display. In addition, R&D (research and development) people try to study more excellent display technology so as to increase efficiency and specification of displays.

Particularly, the conventional display has a driving circuit and a display module, wherein the driving circuit generates a plurality of polarity control signals, a plurality of output control signals, and a plurality of display driving signals, and the display module can be a panel. In practical applications, the driving circuit outputs the signals through a buffer of an output end to control the display module so as to display images.

It is noted that the conventional display device generates or releases an analog current (AVDD-AGND current) when connected with the external circuit. It is noted that the conventional display device has a plurality of driving channels, and the driving circuit utilizes the buffer of the output end to transmit the display driving signals to the driving channels. Because the display specification of the conventional display device is higher and higher, the amount of the driving channels becomes more and more, resulting in the generation of noise on the output end that affects the driving efficiency. In addition, during the switch of polarity control signals, the analog signal is easy to generate noise to impair the stability of the driving circuit and raise the EMI issue.

For the above reasons, it is desired to design a display driving circuit for decreasing noise and increasing the driving stability.

SUMMARY OF THE INVENTION

In view of prior art, the present invention provides a driving circuit which has a judgment mechanism and is capable of decreasing noise.

It is an object of the present invention to provide a driving circuit which detects a polarity control signal to determine a driving mechanism.

It is another object of the present invention to provide a driving circuit which adjusts a driving current to prevent an analog current from generating noise.

It is another object of the present invention to provide a driving circuit which controls a driving timing to decrease noise.

The present invention provides a driving circuit which is provided for connecting a display module and includes a polarity control module, an output control module, and a detecting module. In an embodiment, the polarity control module provides a polarity control signal and the output control module is connected with the polarity control module and provides a plurality of output control signals. In addition, the detecting module is coupled with the polarity control module and the output control module. The detecting module detects the polarity control signal and selectively controls the output control module to operate in at least one of a first control mode and a second control mode to control the output control signals.

It is noted that the driving circuit further includes a driving buffer module, wherein the driving buffer module generates and stores a plurality of driving signals according to the polarity control signal and the output control signals, and each driving signal has a rise/fall time and drives the display module. It is noted that the detecting module, in the first control mode, generates an extension control signal to the driving buffer module to extend the rise/fall time.

In addition the detecting module, in the second control mode, generates a time-sharing control signal, and the time-sharing control signal controls the output control signals to be outputted from the output control module by an asynchronous timing.

Compared to prior arts, the driving circuit of the present invention utilizes the detecting module to detect the polarity control signal and control the output control module to operate in at least one of the first control mode and the second control mode according to a variation of the polarity control signal. In practical applications, the detecting module generates the extension control signal or the time-sharing control signal to control a driving status of the driving circuit so as to decrease noise and increase system stability effectively.

The detailed descriptions and the drawings thereof below provide further understanding about the advantage and the spirit of the present invention.

DETAILED DESCRIPTION OF THE PREFERRED EMBODIMENT

According to an embodiment of the present invention, a driving circuit is provided for decreasing noise. In the embodiment, the driving circuit can be a driving circuit used in a liquid crystal display, but not limited to the embodiment.

Figure 1:
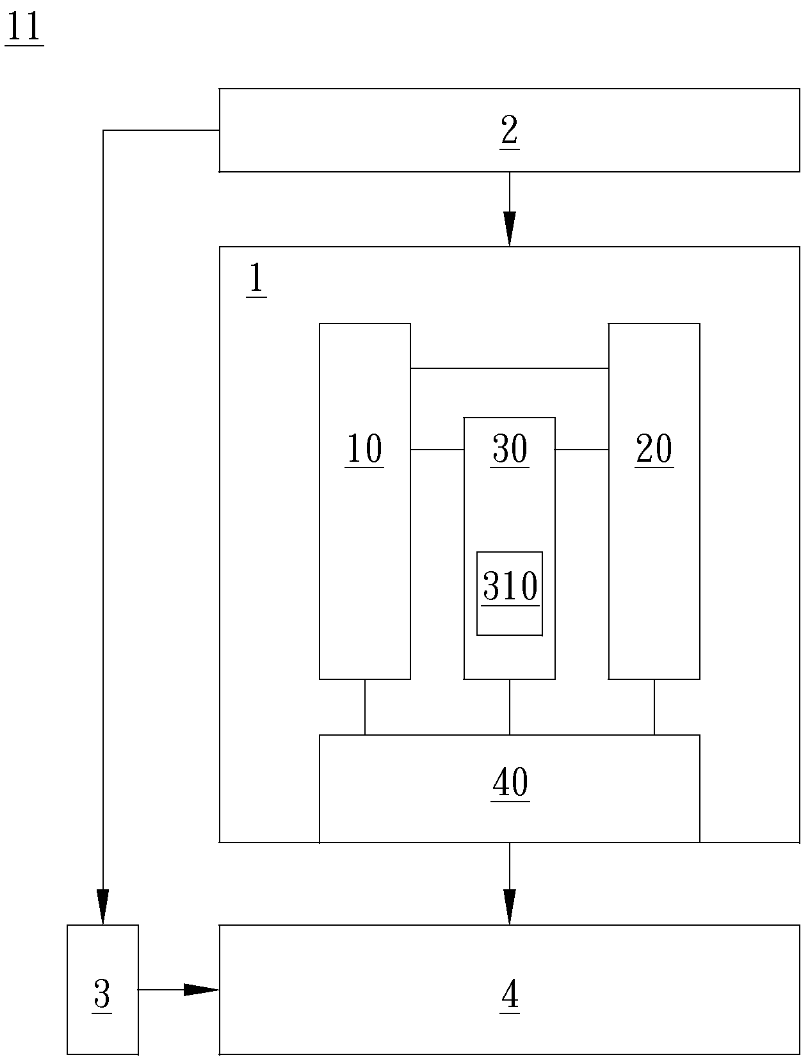
FIG. 1 is a schematic view of an embodiment of a display device and a driving circuit of the present invention.

Please refer to FIG. 1; FIG. 1 is a schematic view of an embodiment of a display device and a driving circuit of the present invention. As shown in FIG. 1, a display device 11 includes a driving circuit 1, a time control module 2, a gate driving circuit 3, and a display module 4, wherein the time control module 2 is connected with the driving circuit 1 and the gate driving circuit 3; and the display module 4 is connected with the driving circuit 1 and the gate driving circuit 3. In addition, the driving circuit 1 includes a polarity control module 10, an output control module 20, a detecting module 30, and a driving buffer module 40, wherein the output control module 20 is connected with the polarity control module 10; the detecting module 30 is connected with the polarity control module 10 and the output control module 20; and the driving buffer module 40 is coupled with the polarity control module 10 and the output control module 20.

In practical applications, the time control module 2 respectively transmits a plurality of control signals to the driving circuit 1 and the gate driving circuit 3, wherein the driving circuit 1 is a source driving circuit, and the driving circuit 1 and the gate driving circuit 3 drive the display module 2 to operate according to the control signals.

Generally, the driving circuit 1 includes a receiver, a data latch module, a signal controller, a shift register module, a level shifter, and a digital/analog converter, wherein these modules process and convert the control signals outputted from the time control module 2 into a plurality of analog data. In addition, the driving circuit 1 transmits the analog data to the display module 4 to control the liquid crystal elements, so that the display module 4 displays images.

As shown in FIG. 1, the driving circuit 1 has a polarity control module 10 and an output control module 20, wherein the polarity control module 10 provides a polarity control signal. It is noted that, in other embodiments, the polarity control module 10 and the output control module 20 can be integrated into a single module and provide the polarity control signal and the output control signals. The arrangement of the polarity control module 10 and the output control module 20 is not limited to the embodiment.

In the embodiment, the detecting module 30 detects the polarity control signal and selectively controls the output control module 20 to operate in at least one of a first control mode and a second control mode to control the output control signals. In other words, the detecting module 30 can control the output control module 20 to operate in the first control mode, the second control mode, or to operate in the first control mode and the second control mode in the meantime.

Figure 2:
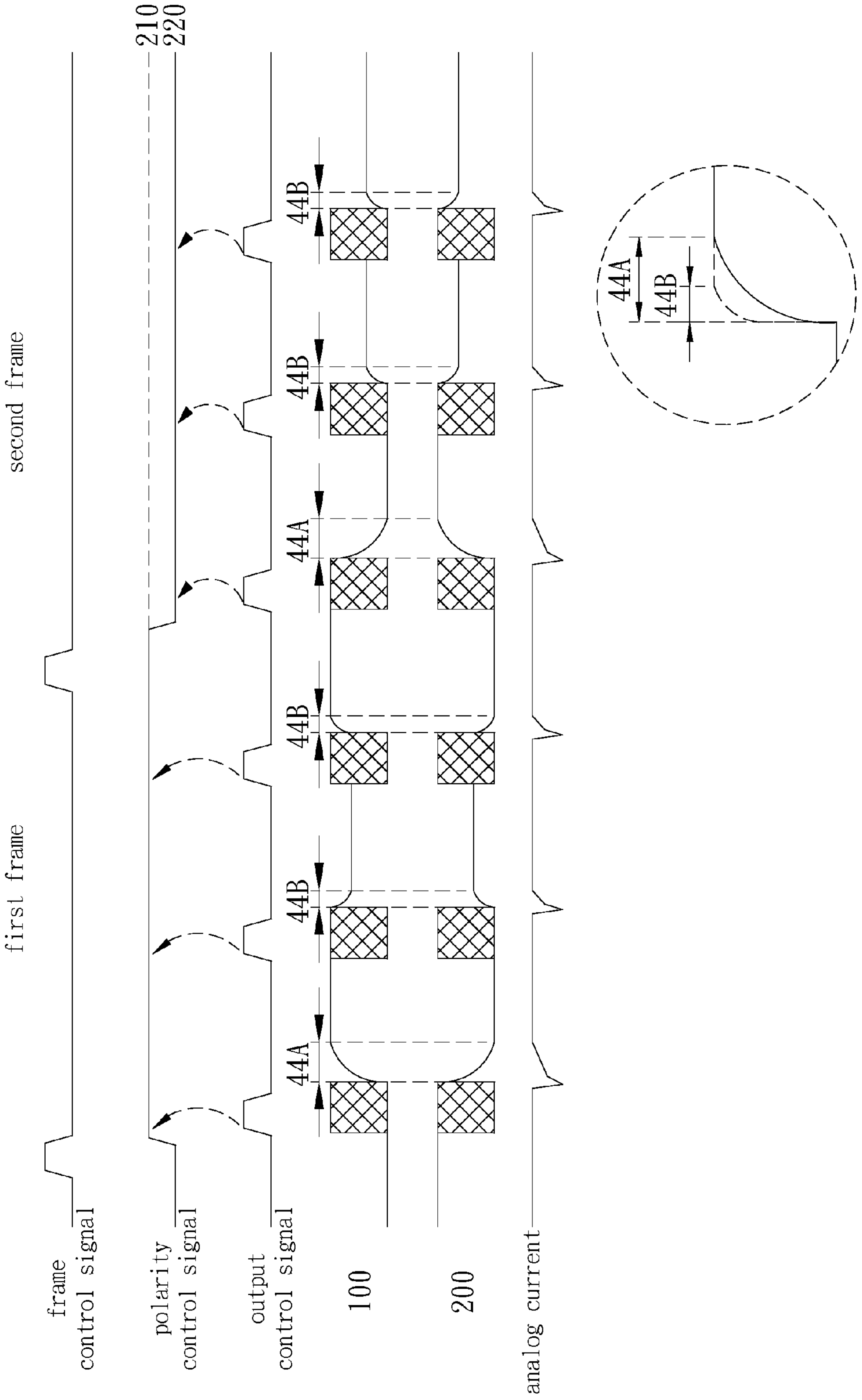
FIG. 2 is a schematic view of an embodiment of a timing diagram of the present invention.

Please refer to FIG. 2; FIG. 2 is a schematic view of an embodiment of a timing diagram of the present invention. As shown in FIG. 2, a frame control signal controls a driving condition of a plurality of frames, wherein the frames includes a first frame and a second frame, but is not limited to the embodiment.

In addition, the polarity control signal has a first polarity level 210 and a second polarity level 220, and the detecting module 30 selectively controls the output control module 20 to operate in at least one of the first control mode and the second control mode when the polarity control signal switches between the first polarity level 210 and the second polarity level 220. It is noted that the detecting module 30 controls the output control module 20 to operate in at least one of the first control mode and the second control mode when the polarity control signal switches from the first polarity level 210 to the second polarity level 220 or when the polarity control signal switches from the second polarity level 220 to the first polarity level 210.

With the following descriptions, the present invention utilizes the embodiment of FIG. 1 to illustrate the detailed operating scheme of the first control mode. Please refer to FIGS. 1 and 2, the driving circuit 1 has a driving buffer module 40, wherein the driving buffer module 40 generates and stores a plurality of driving signals 100/200 according to the polarity control signal and the output control signals, and the driving signals 100/200 respectively have a rise/fall time and drive the display module. In the embodiment, the driving signal 100 indicates the driving data in odd-numbered channels (1st, 3rd, 5th, . . . or (2N−1)th channels) of a plurality of channels, and the driving signal 200 indicates the driving data in even-numbered channels (2nd, 4th, 6th, . . . or (2N)th channels) of the channels.

As shown in FIG. 1, the driving buffer module 40 is further coupled with the detecting module 30. It is noted that, in the first control mode, the detecting module 30 generates an extension control signal to the driving buffer module 40 to extend the rise/fall time. Furthermore, the detecting module 30 detects the polarity control signal and, according to the variation of the polarity control signal, controls the driving circuit 1 to operate in the first control mode, wherein the detecting module 30 generates the extension control signal to the driving buffer module 40, and the driving buffer module 40 extends the rise/fall time so as to adjust a driving ability of the driving signal. As shown in FIG. 2, when the polarity control signal is located at the first polarity level 210 or the second polarity level 220 and the output control signal is provided, the amplitude of the driving signals 100/200 gradually rises up or falls down during the rise/fall time 44B. It is noted that when the polarity control signal switches between the first polarity control level 210 and the second polarity control level 220, the driving buffer module 40 extends the rise/fall time from the rise/fall time 44B to the rise/fall time 44A, wherein the length of the rise/fall time 44A is larger than the length of the rise/fall time 44B. In addition, the rise/fall time 44A can be 1.5 to 3 times the length of the rise/fall time 44B, but not limited to the embodiment.

In practical applications, the driving circuit 1 has an analog current, and the analog current is the driving current between an analog power-level (AVDD) and an analog ground-level (AGND). As shown in FIG. 2, the analog current varies according to the polarity control signal and the output control signals and varies in the timing of the corresponding rise/fall time 44A and the rise/fall time 44B. In the embodiment, the detecting module 30 controls the driving signals to adjust a variation degree of the analog current. Particularly, the detecting module 30 controls the driving ability of the driving signals to influence a variation degree of the analog power current. In other words, the detecting module 30 utilizes the extension control signal to extend the rise/fall time of the driving signals 100/200 to lessen the sudden variation of the amplitude of the driving signal so as to prevent the analog current from generating the noise.

In the present invention, the driving circuit 1 adjusts the rise/fall time by controlling the current amplitude of the driving signal, but not limited to the embodiment. For instance, as shown in FIG. 1, the detecting module 30 includes a variable current unit 310, wherein the variable current unit 310 adjusts the current amplitude of the driving signal of the driving buffer module 40 according to the extension control signal to extend the rise/fall time. It is noted that the variable current unit 310 can be a bias component or a variable resistor and controls the current of the driving signals according to the extension control signal.

In addition, the driving circuit 1 can utilize the detecting module 30 to detect the polarity control signal to control the output control module 20 to operate in the second control module so as to control the output control signals.

Figure 3:
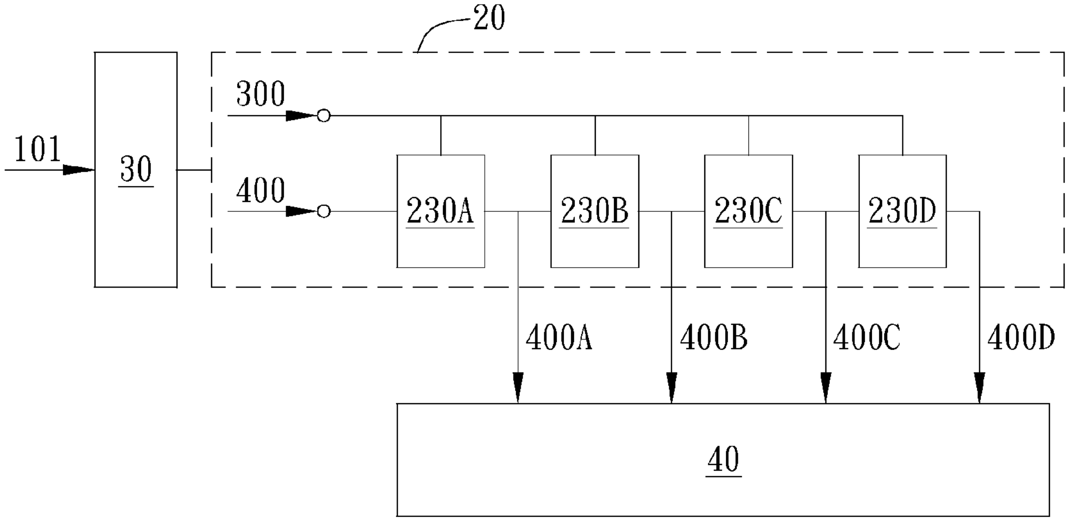
FIG. 3 is a schematic view of an embodiment of the output control module controlling the driving buffer module of the present invention.
Figure 4:
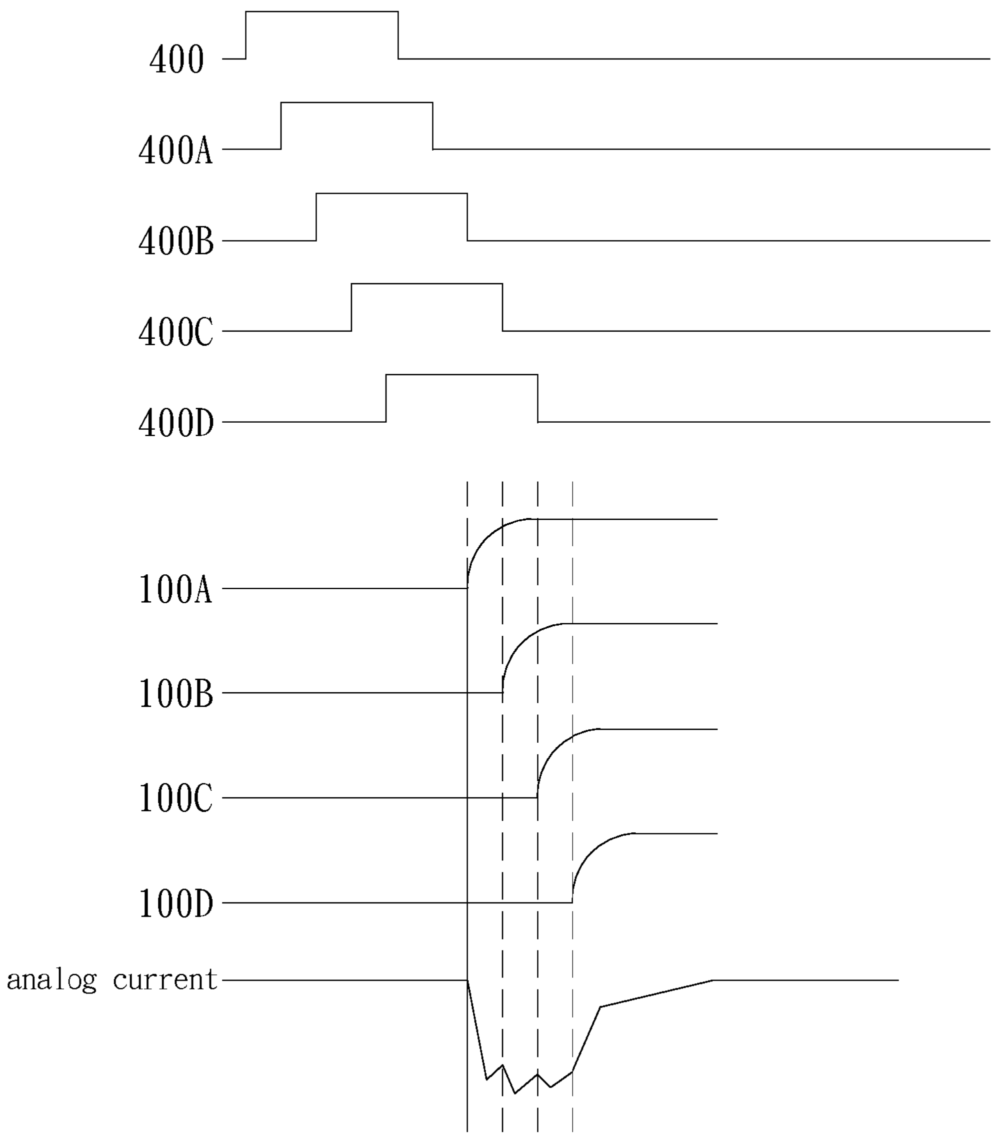
FIG. 4 is a schematic view of an embodiment of the time-sharing control timing controlling the signals of the present invention.

In addition, the present invention utilizes the embodiment of FIGS. 3 and 4 to illustrate the detailed operating process of the second control mode. Please refer to FIG. 3; FIG. 3 is a schematic view of an embodiment of the output control module controlling the driving buffer module of the present invention. As shown in FIG. 3, in the second control mode, the detecting module 30 generates a time-sharing control signal 300 and transmits the time-sharing control signal 300 to the output control module 20, and the time-sharing control signal 300 controls the output control signals 400 to be outputted from the output control module 20 by an asynchronous timing. Furthermore, the detecting module 30 detects the polarity control signal and controls the output control module 20 to operate in the second control mode according to a variation of the polarity control signal, wherein the detecting module 30 generates the time-sharing control signal 300 to the output control module 20 to control an output timing of the output control signal 400. In other words, in the second control mode, the output control module 20 provides the output control signals operated with the asynchronous timing according to the time-sharing control signal 300 and transmits the output control signals to the driving buffer module 40 to generate the driving signals having the asynchronous timing so as to avoid the driving signals driving at the same timing.

Moreover, the time-sharing control signal 300 has a plurality of time-sharing control timings, and the time-sharing timings are different. As shown in FIG. 3, the output control module 20 includes a plurality of time-sharing buffer units 230A through 230D, and the time-sharing buffer units 230A through 230D respectively receive the time-sharing control signal 300 having the time-sharing control timings and outputting the output control signals 400A through 400D to the driving buffer module 40 in the corresponding time-sharing control timings. It is noted that the output control signals 400A through 400D are sequentially outputted to the driving buffer module 40 according to the corresponding time-sharing control timings.

For instance, the time-sharing buffer unit 230A has a first time-sharing control timing, so that the output control signal 400 is converted into an output control signal 400A having the first time-sharing control timing; the time-sharing buffer unit 230B has a second time-sharing control timing, so that the output control signal 400 is converted into an output control signal 400B having the second time-sharing control timing; the time-sharing buffer unit 230C has a third time-sharing control timing, so that the output control signal 400 is converted into an output control signal 400C having the third time-sharing control timing; the time-sharing buffer unit 230D has a fourth time-sharing control timing, so that the output control signal 400 is converted into an output control signal 400D having the fourth time-sharing control timing.

Please refer to FIG. 4; FIG. 4 is a schematic view of an embodiment of the time-sharing control timing controlling the signals of the present invention. As shown in FIG. 4, the output control module 20 respectively controls the driving signals 100A through 100D by the output control signals 400A through 400D having the first time-sharing control timing through the fourth time-sharing control timing. In the embodiment, the driving circuit 1 has 1000 output channels, but is not limited to the embodiment. It is noted that the output control signal 400A and the driving signal 100A correspond to the first through the 250th output channels; the output control signal 400B and the driving signal 100B correspond to the 251th through the 500th output channels; the output control signal 400C and the driving signal 100C correspond to the 501th through the 750th output channels; the output control signal 400D and the driving signal 100D correspond to the 751th through the 1000th output channels. However, in other embodiments, the driving signals can respectively correspond to the first through the 200th output channels, the 201th through the 300th output channels, the 301th through the 500th output channels, the 501th through the 750th output channels, the 751th through the 1000th output channels. In other words, the driving signals can respectively correspond to equal or different amount of the output channels and is not limited to the embodiment.

In the embodiment, the output control signals 400A through 400D divide 1000 output channels into 4 output groups, wherein each output group has different control timing (the first time-sharing control timing through the fourth time-sharing control timing), so that the driving signals in the output channels are not driven in the same timing, the driving signals driven in the same timing are further dispersed so as to decrease noise. In other words, the driving buffer module 40 outputs the driving signals 400A through 400D to the display module 4 according to the time-sharing control signal 300 having the time-sharing control timings, wherein the time-sharing control timing is the asynchronous timing. In practical applications, the detecting module 30 utilizes the time-sharing control signal 300 to control the output control signals 400A through 400D of the output control module 20 to adjust the variation degree of the analog current so as to prevent the analog current from generating the noise. It is noted that the embodiment divides the output channels into 4 output groups with equal amount of channels; however, in other embodiments, the driving circuit 1 divides the output channels into groups having different amount of channels according to practical requirement and is not limited to the embodiment.

In the above embodiment, the driving circuit 1 of the present invention can be driven to operate in the first control module or the second control mode alternatively. It is noted that in other embodiments, the driving circuit 1 of the present invention can be driven to operate in the first control mode and the second control mode simultaneously.

In another embodiment, the driving circuit can simultaneously control the driving buffer module 40 and the output control module 20 to operate simultaneously in the first control mode and the second control mode. Furthermore, the detecting module 30, according to the polarity control signal as well as the variation of the polarity control signal, controls the driving buffer module 40 and the output control module 20 to operate in the first control mode and the second control mode simultaneously. In other words, the detecting module 30 can generate the extension control signal to the driving buffer module 40 and generates the time-sharing control signal to the output control module 20, so that the driving buffer module 40 extends the rise/fall time according to the extension control signal, and the output control module 20, according to the time-sharing control signal, outputs the output control signal 400A through 400D having asynchronous timing to the driving buffer module 40 to disperse the timings of the driving signals. In practical applications, the driving circuit of the present invention simultaneously controls the rise/fall time and the driving timing of the driving signals to prevent the analog current from generating the noise so as to improve the operation efficiency.

In the embodiment, the present invention provides a third control mode which can perform the functions of the first control mode and the second control mode. In other words, the driving circuit can simultaneously control the driving buffer module 40 and the output control module 20 to operate simultaneously in the third control mode. That is, the detecting module 30, according to the polarity control signal as well as the variation of the polarity control signal, controls the driving buffer module 40 and the output control module 20 to operate in the third control mode.

Compared to prior arts, the driving circuit of the present invention utilizes the detecting module to detect the polarity control signal and control the output control module to operate in at least one of the first control mode and the second control mode according to a variation of the polarity control signal. In practical applications, the detecting module generates the extension control signal or the time-sharing control signal to control a driving status of the driving circuit so as to decrease noise and increase system stability effectively.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A driving circuit for connecting a display, the driving circuit comprising:

a polarity control circuit providing a polarity control signal;

an output control circuit connected with the polarity control circuit and providing a plurality of output control signals; and a detecting circuit coupled with the polarity control circuit and the output control circuit, wherein the detecting circuit detects the polarity control signal and selectively controls the output control circuit to operate in at least one of a first control mode and a second control mode to control the output control signals;

wherein in the second control mode, the detecting circuit generates a time-sharing control signal and transmits the time-sharing control signal to the output control circuit, and the time-sharing control signal controls the output control signals to be outputted from the output control circuit by an asynchronous timing.

2. The driving circuit of claim 1, further comprising:

a driving buffer circuit coupled with the polarity control circuit and the output control circuit, wherein the driving buffer circuit generates and stores a plurality of driving signals according to the polarity control signal and the output control signals, and each driving signal has a rise/fall time and drives the display.

3. The driving circuit of claim 2, wherein the driving buffer circuit is further coupled with the detecting circuit; in the first control mode, the detecting circuit generates an extension control signal to the driving buffer circuit to extend the rise/fall time.

4. The driving circuit of claim 3, wherein the detecting circuit comprises:

a variable current circuit adjusting a current amplitude of the driving signal according to the extension control signal to extend the rise/fall time.

5. The driving circuit of claim 2, wherein the driving circuit has an analog current, the analog current varies according to the polarity control signal and the output control signals, and the detecting circuit controls the output control signals or the driving signals to adjust a variation degree of the analog current.

6. The driving circuit of claim 1, wherein the polarity control signal has a first polarity level and a second polarity level, and the detecting circuit selectively controls the output control circuit to operate in at least one of the first control mode and the second control mode when the polarity control signal switches between the first polarity level and the second polarity level.

7. A driving circuit for connecting a display, the driving circuit comprising:

a polarity control circuit providing a polarity control signal;

an output control circuit connected with the polarity control circuit and providing a plurality of output control signals; and a detecting circuit coupled with the polarity control circuit and the output control circuit, wherein the detecting circuit detects the polarity control signal and selectively controls the output control circuit to operate in at least one of a first control mode and a second control mode to control the output control signals;

wherein in the second control mode, the detecting circuit generates a time-sharing control signal and transmits the time-sharing control signal to the output control circuit, wherein the time-sharing control signal has a plurality of time-sharing control timings, and the time-sharing timings are different.

8. The driving circuit of claim 7, further comprising:

a driving buffer circuit coupled with the polarity control circuit and the output control circuit, wherein the driving buffer circuit generates and stores a plurality of driving signals according to the polarity control signal and the output control signals, and each driving signal has a rise/fall time and drives the display.

9. The driving circuit of claim 8, wherein the driving buffer circuit is further coupled with the detecting circuit; in the first control mode, the detecting circuit generates an extension control signal to the driving buffer circuit to extend the rise/fall time.

10. The driving circuit of claim 9, wherein the detecting circuit comprises:

a variable current circuit adjusting a current amplitude of the driving signal according to the extension control signal to extend the rise/fall time.

11. The driving circuit of claim 8, wherein the driving circuit has an analog current, the analog current varies according to the polarity control signal and the output control signals, and the detecting circuit controls the output control signals or the driving signals to adjust a variation degree of the analog current.

12. The driving circuit of claim 7, wherein the output control circuit comprises:

a plurality of time-sharing buffer circuits respectively receiving the time-sharing control signal having the time-sharing control timings and outputting the output control signals to the driving buffer circuit in the corresponding time-sharing control timings.

13. The driving circuit of claim 12, wherein the driving buffer circuit outputs the driving signals to the display according to the time-sharing control signal having the time-sharing control timings.

14. The driving circuit of claim 7, wherein the polarity control signal has a first polarity level and a second polarity level, and the detecting circuit selectively controls the output control circuit to operate in at least one of the first control mode and the second control mode when the polarity control signal switches between the first polarity level and the second polarity level.

15. A driving circuit for connecting a display, the driving circuit comprising:

a polarity control circuit providing a polarity control signal;

an output control circuit connected with the polarity control circuit and providing a plurality of output control signals;

a detecting circuit coupled with the polarity control circuit and the output control circuit, wherein the detecting circuit detects the polarity control signal and selectively controls the output control circuit to operate in at least one of a first control mode and a second control mode to control the output control signals; and a driving buffer circuit coupled with the polarity control circuit and the output control circuit, wherein the driving buffer circuit generates and stores a plurality of driving signals according to the polarity control signal and the output control signals, and each driving signal has a rise/fall time and drives the display;

wherein the driving circuit has an analog current, the analog current varies according to the polarity control signal and the output control signals, and the detecting circuit controls the output control signals or the driving signals to adjust a variation degree of the analog current.

16. The driving circuit of claim 15, wherein the driving buffer circuit is further coupled with the detecting circuit; in the first control mode, the detecting circuit generates an extension control signal to the driving buffer circuit to extend the rise/fall time.

17. The driving circuit of claim 16, wherein the detecting circuit comprises:

a variable current circuit adjusting a current amplitude of the driving signal according to the extension control signal to extend the rise/fall time.

18. The driving circuit of claim 15, wherein in the second control mode, the detecting circuit generates a time-sharing control signal and transmits the time-sharing control signal to the output control circuit, and the time-sharing control signal controls the output control signals to be outputted from the output control circuit by an asynchronous timing.

19. The driving circuit of claim 15, wherein in the second control mode, the detecting circuit generates a time-sharing control signal and transmits the time-sharing control signal to the output control circuit, wherein the time-sharing control signal has a plurality of time-sharing control timings, and the time-sharing timings are different.

20. The driving circuit of claim 15, wherein the polarity control signal has a first polarity level and a second polarity level, and the detecting circuit selectively controls the output control circuit to operate in at least one of the first control mode and the second control mode when the polarity control signal switches between the first polarity level and the second polarity level.

* * * * *